(12) United States Patent
Renner

(10) Patent No.: US 11,548,316 B2
(45) Date of Patent: *Jan. 10, 2023

(54) WHEEL FOR A VEHICLE

(71) Applicant: MUBEA CARBO TECH GMBH, Salzburg (AT)

(72) Inventor: Christoph Renner, Gosau (AT)

(73) Assignee: MUIBEA CARBO TECH GMBH, Salzburg (AT)

( * ) Notice: Subject to any disclaimer, the term of this patent is extended or adjusted under 35 U.S.C. 154(b) by 564 days.

This patent is subject to a terminal disclaimer.

(21) Appl. No.: 16/091,013

(22) PCT Filed: Mar. 30, 2017

(86) PCT No.: PCT/EP2017/057604
§ 371 (c)(1),
(2) Date: Oct. 3, 2018

(87) PCT Pub. No.: WO2017/174445
PCT Pub. Date: Oct. 12, 2017

(65) Prior Publication Data
US 2019/0061420 A1     Feb. 28, 2019

(30) Foreign Application Priority Data

Apr. 4, 2016     (EP) .................................. 16163759

(51) Int. Cl.
*B60B 5/02*     (2006.01)
*B60B 3/04*     (2006.01)
(Continued)

(52) U.S. Cl.
CPC ................ *B60B 5/02* (2013.01); *B60B 3/044* (2013.01); *B60B 3/10* (2013.01); *B60B 23/06* (2013.01);
(Continued)

(58) Field of Classification Search
CPC .......... B60B 3/04; B60B 3/041; B60B 3/042; B60B 3/044; B60B 3/10; B60B 5/02; B60B 23/06; B60B 23/08
See application file for complete search history.

(56) References Cited

U.S. PATENT DOCUMENTS

| 5,538,329 A | 7/1996 | Stach |
| 6,019,149 A | 2/2000 | Stringer |

(Continued)

FOREIGN PATENT DOCUMENTS

| DE | 10 2013 114 343 A1 | 7/2015 |
| EP | 0 826 518 A2 | 3/1998 |

(Continued)

OTHER PUBLICATIONS

Japanese Patent Office, English language translation of a Japanese Office Action for Japanese Patent Application No. 2018-547440, dated Aug. 18, 2020 (4 pages).

(Continued)

*Primary Examiner* — Jason R Bellinger
(74) *Attorney, Agent, or Firm* — Pauley Erickson & Swanson

(57) ABSTRACT

A wheel includes a rim and a wheel center interconnected to the rim. The wheel center includes at least one spoke extending from a wheel hub to the rim in a radial direction. The rim includes per the at least one spoke a first contact area and the at least one spoke includes at its outer end a second contact area which in a mounted position is aligned to the first contact area. The at least one spoke includes at least one hollow space extending in the radial direction of the spoke.

14 Claims, 4 Drawing Sheets

(51) Int. Cl.
  *B60B 3/10*  (2006.01)
  *B60B 23/06*  (2006.01)
  *B60B 1/14*  (2006.01)
  *B60B 21/12*  (2006.01)
  *B60B 21/06*  (2006.01)
  *B60B 23/08*  (2006.01)

(52) U.S. Cl.
  CPC ............... *B60B 1/14* (2013.01); *B60B 21/068* (2013.01); *B60B 21/12* (2013.01); *B60B 23/08* (2013.01); *B60B 2310/305* (2013.01); *B60B 2360/341* (2013.01); *B60B 2900/111* (2013.01); *B60B 2900/311* (2013.01)

(56) References Cited

U.S. PATENT DOCUMENTS

| | | | |
|---|---|---|---|
| 6,325,462 | B1 | 12/2001 | Hummel et al. |
| 6,497,459 | B2 * | 12/2002 | Hummel .................. B60B 1/08 |
| | | | 301/64.101 |
| 6,758,533 | B1 | 7/2004 | Hummel et al. |
| 7,487,811 | B2 * | 2/2009 | Schelhaas ............... B60B 1/041 |
| | | | 152/381.5 |
| 7,918,513 | B2 * | 4/2011 | Wilson ..................... B60B 5/02 |
| | | | 301/64.702 |
| 10,377,172 | B2 * | 8/2019 | Werner .................. B60B 23/08 |
| 10,414,206 | B2 * | 9/2019 | Renner .................... B60B 3/045 |
| 2004/0095014 | A1 * | 5/2004 | Veux ..................... B60B 21/068 |
| | | | 301/58 |
| 2015/0273934 | A1 * | 10/2015 | Huidekoper ............ B60B 3/045 |
| | | | 301/11.1 |
| 2016/0325582 | A1 * | 11/2016 | Werner ..................... B60B 5/02 |
| 2017/0087929 | A1 * | 3/2017 | Walls-Bruck ............. B60B 5/02 |
| 2019/0111730 | A1 * | 4/2019 | Renner ................. B60B 21/068 |
| 2019/0135032 | A1 * | 5/2019 | Chenault, III ............ B60B 3/02 |
| 2019/0248043 | A1 * | 8/2019 | Snyder .................... B29C 70/32 |

FOREIGN PATENT DOCUMENTS

| | | | | |
|---|---|---|---|---|
| GB | | 27835 A | 6/1914 | |
| GB | | 191327835 A | 6/1914 | |
| JP | | 2001-260601 A | 9/2001 | |
| WO | WO 2006/097856 A2 | | 9/2006 | |
| WO | WO 2013/045618 A1 | | 4/2013 | |
| WO | WO 2014/058313 A1 | | 4/2014 | |
| WO | WO-2014129900 A1 * | | 8/2014 | ............ B60B 23/10 |
| WO | WO 2015/106760 A1 | | 7/2015 | |

OTHER PUBLICATIONS

IP Australia, Australian Examination Report (No. 1) and Search Results for Australian Patent Application No. 2017247557, dated Nov. 17, 2021 (5 pp.).

* cited by examiner

WHEEL FOR A VEHICLE

BACKGROUND OF THE INVENTION

Field of the Invention

The present invention is directed to a wheel for a vehicle comprising a rim made of composite material and a wheel center made out of the same or a different material, such as a light weight metal alloy.

Discussion of Related Art

Light vehicle wheels are desirable to improve the driving quality and performance as well as to keep the overall vehicle weight light. At the same time, safety regulations exists to ensure sufficient durability, especially of the wheel's rim. On the one hand, the design aims to make the wheel as light as possible, on the other hand, it is necessary to provide a sufficient durable and strong mechanical structure. The wheels generally feature air openings and spokes which extend radially from the rim spider to the rim well of the wheel.

Due to advances in material research, the wheel material is further shifted to light-metal and composite materials, which are light, durable and able to bear high loads at the same time. Hybrid-wheels made from a combination of fiber reinforced plastics as well as conventional materials, such as light weight metal alloys provide very good results.

WO 2006/097856 A2 was published on 21 Sep. 2006 on behalf of Dymag Racing UK Ltd. and discloses a vehicle wheel that comprises a rim made from a plastic material and a spoke unit or wheel disk made from a metal. The spoke unit or wheel disk is connected to the rim by means of at least one connecting element that is guided through the rim base.

WO 2013/045618 A1 was published on 4 Apr. 2013 on behalf of BBS Japan and Washi Kosan Co. Ltd. and discloses a wheel that comprises a rim made from a carbon fibers reinforced plastic and a wheel spider made from a metal alloy. According to the application, the wheel spider can be fastened to the rim by means of a clamping ring. The application shows an embodiment of a wheel where the clamping ring is arranged in the center of the wheel and is fastened to the wheel spider by means of screws, while clamping a portion of the rim well.

WO 2014/058313 A1 was published on 15 Apr. 2014 on behalf of Louis Huidekoper and shows a vehicle wheel with a rim and a wheel center made from two different materials. According to the document, the rim may be made from polymers reinforced with glass fibers, carbon fibers and others. The wheel center may be made from a metal. The rim comprises a circumferential edge at its radially inner side. The wheel center and edge comprise openings suited to receive connecting elements. The openings in the edge or the openings in the wheel center have a radially elongated shape, intended to reduce stress induced when materials with different coefficients of thermal expansion are heated.

U.S. Pat. No. 5,538,329 published on the 23 Jul. 1996 by Porsche AG discloses a rim for a motor vehicle with several radial hollow spokes in a wheel disk which is manufactured in a die tool and is later connected with a rim well. The wheel has a cast wheel spider comprising several hollow spokes connected with a rim ring by way of a friction weld, the hollow spokes having core openings for a sand core in the area of the outer circumference which are directed toward the rim ring. Furthermore, the hollow spokes comprise reinforcing ribs between the opposite walls of each hollow spoke in the area. After casting, the sand cores fall out or can be blown out. A later patent application, EP0826518 published on the 4 Mar. 1998 by Porsche AG, relates to an improved method for the removal of the mould sand where the wheel is further subjected to vibrations and flushed with a fluid so that the sand leaves the wheel through apertures. After the sand removal, the apertures can be covered with a closure.

U.S. Pat. No. 6,325,462B published on 4 Feb. 2001 by Porsche AG comprises a light metal wheel which is produced in a casting process having hollow spokes. In the hollow space, the wheel spokes have a lost core consisting of a metallic material in the form of metal foam or of a closed shell-shaped element. The lost core remains in the hollow space after casting. The core is further made out of one piece for the whole wheel connecting all hollow parts of the spokes and the annulus space. One advantage of the lost core technology is thereby that there are no manufacturing steps required for the removal of the cores after casting, e.g. the flushing out of the sand as it is the case for the sand core technology.

U.S. Pat. No. 6,758,533 published on the 6 Jul. 2004 by Porsche AG discloses a casted light metal wheel for a motor vehicle comprising a residual core made of a metallic material and arranged in at least one hollow space of the wheel. However, the core remains in the wheel after the casting process. The materials of which the hollow bodies can be made are ceramic materials, aluminum alloys, or steel alloys and can be filled with foamable metal to obtain an optimal stability of the hollow body. To provide further local reinforcements, metallic or ceramic long fiber elements can be arranged at the core or the mold and encapsulated.

SUMMARY OF THE INVENTION

Wheels for vehicles must meet a comprehensive list of requirements, including specific dimensions, minimum mechanical competence, maximum total weight, specified mass distribution, durability and visual appearance. As these requirements highly depend on the designated use as well as the designated customers, manufacturers of wheels usually have to provide a variety of different wheel types.

Multipart wheel designs comprising an interconnected rim and a wheel center thereto offer the possibility of using different materials for the rim and the wheel center and to design and arrange the material of the components in an optimized manner. Although this may be done merely for esthetic reasons, such an approach can be used further in order to improve a wheel's performance. This can be achieved by reducing a wheel's moment of inertia, which has a significant impact on vehicle handling. Therefore, on the one hand, the total mass of a wheel has to be minimized. On the other hand, the fact must be taken into account that mass disposed away from the rotation axis contributes significantly more to the moment of inertia than mass close to the rotation axis.

Wheels with low weight and low moment of inertia therefore can be obtained by combining rims made from especially light materials with wheel centers made from more conventional materials. Furthermore, the two part wheel does enable certain designs of the wheel center that cannot be realized with wheels made in one part. In addition pairings of different metals, including magnesium, aluminum, titanium or steel, may be chosen. Within the context of the present invention, "aluminum", "magnesium" and "titanium" should be understood as meaning also their alloys.

The usage of composite materials may decrease the mass and moment of inertia of wheels even more if compared to designs using metals only. As such, fiber reinforced plastics comprising e.g. glass fibers, carbon fibers, aramid fibers, basalt fibers or combinations thereof may be used for rims and/or wheel centers. Such types of wheels made from fiber reinforced plastics and metals can be referred to as "hybrid wheels". A first type of hybrid wheels comprises a wheel center made from a metal, while the rim is made from a fiber reinforced plastic. A second type comprises a rim made from a metal, while the wheel center is made from a fiber reinforced plastic.

A major drawback of many wheels made from multiple materials is that a lot of material combinations which are advantageous from a structural mechanical point of view (e.g. regarding total weight, strength or stiffness) turn out to cause drawbacks regarding other requirements—such as electrochemical compatibility of the materials. For example, pairings of components made from a carbon fiber reinforced plastic and components made from aluminum often turn out to be critical with respect to electrochemical contact corrosion (the same effect also occurs for other pairings of materials, such as pairings between some types of steel and aluminum). As a result of such corrosion phenomena, junctions between a rim and a wheel center may become stained, which for esthetic reasons is undesirable. But even more important, such corrosion phenomena decrease the mechanical durability of the junction and hence have a negative effect on the durability of the whole wheel.

Another drawback of wheels that are assembled of components made from different materials results from the fact that a junction between the two of them has to withstand very high brake and drive torque as well as it is exposed to cyclic loading when driving. Hence, designing the transition region between wheel center and rim such that load transfer cannot evoke critical stress concentrations can be very demanding if the rim and the wheel center are made from materials with highly differing mechanical material properties and overall low weight.

This especially holds true for pairings of fiber reinforced plastics and metals. Damage of the matrix which embeds the fibers can have a significant impact on the mechanical competence of a composite component. In addition, exposure of fibers substantially promotes contact corrosion, in specific for a pairing between carbon fiber reinforced plastic and aluminum. Therefore, phenomena related to contact corrosion and contact mechanics in the area of a junction between the wheel center and adjacent rim have a major impact on the durability of a wheel.

It is one object of the present invention to provide an improved wheel comprising a rim and a wheel center that are made as separate components and if appropriate from different materials. One aim of the invention is to provide a wheel which has an increased durability, performance and a lower weight if compared to wheels known from the prior art.

According to the invention, a wheel comprises a rim and a wheel center interconnected to the rim. Within the context of the present invention, "wheel center" should normally be understood as spoke structure respectively wheel spider. The wheel center comprises at least one spoke extending from a wheel hub to the rim in a radial direction. The rim comprises per the at least one spoke a first contact area and the at least one spoke comprises at its outer end a second contact area which in a mounted position is aligned to the first contact area of the rim. The at least one spoke comprises on the inside a hollow space whereby the cross-section of the spoke becomes cellular comprising at least one cell which is encompassed by the material of the spoke. If appropriate, the cross-section may comprise more than one cell behind or adjacent to each other. The hollow space normally extends on the inside following the radial direction of the spoke. By the hollow space the cross-section of the spoke becomes in principle annular shaped whereby the material forming the spoke is arranged around the hollow space (cell).

The hollow space may penetrate the second contact area forming a mouth in the region, where the at least one spoke and the rim interact. The mouth can be open or closed. Good results can be achieved if the second contact area (circumferentially) encompasses the mouth of the hollow space. Load between the spoke and the rim is transferred by the surrounding contact area directly or indirectly. Depending on the field of application an (inner) wall of the hollow space can be coated by a protective material. The protective material can be layer of material. Alternatively or in addition the hollow space can be at least partially filled by another preferably light weight material, e.g. a foam. If appropriate, the hollow space can further be used to counter unbalanced mass or to shift the natural frequency of the wheel by adjusting the individual design of the hollow space per spoke. This can be achieved by adding mass to and/or removing mass from the hollow space and/or by inserting at least one balancing weight. Furthermore, the hollow space can be designed such that it can be used as a holding fixture during surface treatments of the wheel center, such as coating or painting of the same. Depending on the field of application and the material combination, an intermediate layer can be arranged between the at least one first and the at least one second contact area preventing at least partially direct contact between the at least one first and the at least one second contact area. If appropriate the intermediate layer may be foreseen to seal the mouth of the hollow space in the corresponding spoke. The intermediate layer preferably comprises at least one load bearing area/section to transfer load between the rim and the at least one spoke during operation. The intermediate layer is preferably three-dimensionally shaped following the contour for the rim. The intermediate layer may act itself as a seal and/or may comprise at least one sealing area as described hereinafter. In a variation the at least one sealing area is arranged circumferentially of the intermediate layer along an outer and/or inner boundary. Depending on the field of application the intermediate layer can be made from an elastic material. In a preferred variation the intermediate layer comprises a highly resistant metal layer. The metal layer can be coated by a polymeric material and/or a ceramic and/or a glass to improve resistance. The metal layer can be made by a stamping and forming process. Good results can be achieved if the metal layer is made from at least one material out of the group of stainless steel, titanium, aluminum, magnesium. The intermediate layer may comprise an adhesive that mechanically interconnects (bonds) the at least one first and the at least one second contact area.

Normally at least one connection element interconnects the rim and the spoke across the related first and second contact area. In a preferred variation the connection element protrudes the at least one intermediate layer if present. Normally the connection element is chosen from the group consisting of a screw, bolt and/or rivet. In a preferred variation at least one connection element protrudes the rim at the rim well and/or in a region between the rim well and the outer hump and/or in a region between the outer hump and the outer rim edge. The connection element may be arranged essentially perpendicular to at least part of the intermediate layer. Depending on the field of application the connection element can at least partially be embedded in an adhesive. If appropriate the connection element can be covered by a layer of composite material on the inside (rim well) where a tire is mounted. In a variation the connection element is arranged at an angle to the longitudinal direction of the hollow space.

The rim and/or the wheel center can be made from a material chosen from the group consisting of steel, aluminum, magnesium, titanium, fiber reinforced plastic with a fiber material made from carbon, aramide, glass, basalt, steel. Depending on the material combination the intermediate layer may comprise an electrically insulating material. The electrically insulating material can comprise at least one material out of the group of rubber, silicone, glass fibers, ceramic. At least one insert can be foreseen which is arranged in the rim and extending from the rim into the wheel center. The insert can be a bushing. The bushing may comprise a flange which in the assembled position supports a head of the bolt (connection element) with respect to a shoulder of the bore in which the bolt sits. The bushing preferably extends across the rim and reaches into the spoke. The bushing may help in transferring drive and/or brake torque from the wheel center to the rim and vice-versa. The bushing may also serve as an electrical insulator between the rim and the wheel center.

Highly durable wheels may be achieved if the intermediate layer completely prevents direct contact between the at least one first and the at least one second contact area. Due to such an intermediate layer, a direct physical-respectively electrochemical contact—can be completely avoided. Thereby, contact corrosion can be efficiently prevented and/or the contact pressure can be more evenly distributed over the contact areas. However, according to one variant of the invention, for some types of wheels the intermediate layer may allow direct contact between portions of the at least one first and the at least one second contact area. Such variants may be advantageous in order to optimize the distribution of contact pressure in some parts of the contact areas for material pairings which are actually not prone to contact corrosion.

According to one variant of the invention the intermediate layer is designed to prevent damaging of a protective surface layer on a first and/or second contact area. For fiber reinforced plastics, such a protective surface layer may be made from an epoxy resin or a finish in order to protect the subjacent fibers. For metals, the protective surface layer may be a finish or a passive layer (e.g. made from a polymer material), as e.g. may be present on aluminum or titanium. Depending on the application the presence of such a passive layer may be important e.g. to prevent corrosion phenomena.

In order to help to optimize load transfer between a wheel center and a rim, according to one variant of the invention an intermediate layer may comprise at least one load bearing area/section. Such a load bearing area may be a specific portion of the at least one intermediate layer, designed to allow proper load transfer. In another variation of the invention the whole intermediate layer serves as a load bearing area. In another variation of the invention, some parts of the intermediate layer are specifically designed for load transfer, while other parts do not (or at least not significantly) contribute to load-bearing. In order to optimize load transfer, a load bearing area may have a specific thickness and certain material that e.g. cause a more even distribution of contact stress.

If preferred, the intermediate layer comprises an electrically insulating material, which allows further reduction—respectively prevention—of contact corrosion phenomena. Such an electrically insulating material may be a plastic material, such as for example polystyrene (PS), polypropylene (PP), high-density polyethylene (HDPE) and low-density polyethylene (LDPE), polytetrafluoroethylene (PTFE), polyethylene terephthalate (PET), polyamides (PA), rubber or silicone. However, also other materials may be used, such as glass or ceramics.

Alternatively or in addition, the intermediate layer may also comprise fibers, such as glass fibers. For example, the intermediate layer may comprise a fabric made from glass fibers or a composite structure reinforced by glass fibers. Using glass fibers may be advantageous for providing good electrical insulation.

If appropriate, the intermediate layer can comprise at least one sealing area. Such a sealing area may be a (closed) sealing bead. In order to prevent moisture, air, salt, dust or other substances from entering into the interstitial space between the first and the second contact area, the sealing area may be arranged at the boundary of the intermediate layer, respectively circumferentially of the intermediate layer. Thus, intrusion and accumulation of corrosion-enhancing substances in the interstitial space can be prevented and the development of a local corrosive environment can be avoided.

Good results may be obtained if the sealing area comprises an elastic material or is made entirely from an elastic material. As a result, proper sealing can be ensured even if the junction is cyclically deformed when driving. Particularly good results may be obtained if the sealing area is made from a FKM or a vulcanized rubber or a silicone or a nitrile butadiene rubber (NBR) or an EPDM rubber or combinations thereof.

In a variant of the invention, the load bearing area and sealing area are the same area, hence the load bearing area is also acting as sealing area—respectively vice versa.

For some purposes the intermediate layer may comprise multiple layers made from different materials. As such it may comprise layers made from a continuum material, such as a plastic or metal, as well as layers made from a non-continuum material, such as a fabric, e.g. a fabric made from glass fibers. With such a multi-layered intermediate layer, efficient electrical insulation can be combined with e.g. good sealing and a more even distribution of contact stress.

In order to allow for a direct load transfer between a wheel center and a rim, the intermediate layer may be a laminar intermediate layer, hence have a thickness that is relatively small if compared to the other dimensions of the intermediate layer.

For some purposes the intermediate layer may have a thickness that varies across its area. Thus the stress distribution and load transfer between the wheel center and the rim may be controlled, respectively optimized. Good results may be obtained if the intermediate layer has a mean thickness of about 0.2 mm to 2.0 mm. Intermediate layers with such a thickness offer for many materials sufficient electrical insulations and optimal stress distribution, without deteriorating load transfer between the wheel center and the rim.

An intermediate layer may be a preformed three-dimensional body, hence already be at least partially preformed to the shape of the at least one first and/or the at least one second contact area. This facilitates the assembly of a wheel. Good results may be obtained if the intermediate layer is at least partially made by a stamping and/or deep drawing process. As a starting material for such a stamping and/or deep drawing process, e.g. a sheet metal or a plastic sheet may be used. If appropriate the intermediate layer may comprise a depression which extends above the general surface of the intermediate element and in a mounted position reaches into the mouth of the hollow space. The intermediate layer may seal the mouth of the hollow space against the outside and/or the rim. Alternatively or in addition an intermediate layer may also be made from a relatively elastic material which allows the intermediate layer to be draped on a contact area prior to the final assembly of the wheel. As such it may be draped on the at least one second contact area or on the at least one first contact area before the wheel center and the rim are joint together.

If appropriate the intermediate layer may have an opening to allow accumulated fluids being collected in the hollow space to emit to the outside and therefore preventing unbalanced mass in the wheel. An opening placed at the rim side of the hollow space further permits centrifugal forces to render the accumulated particles to the outside.

In a variant of the invention the intermediate layer is connected to the at least one second contact area or on the at least one first contact area using an adhesive. Thus an intermediate layer's position relative to a contact are can reliably be maintained during assembly. A depression as described above can help to position the intermediate layer.

If appropriate, an intermediate layer is made using an injection-molding process. Good results may be obtained if an intermediate layer is made using multi-component injection molding. Such a variant of the invention may be advantageous in order to produce intermediate layers that comprise bearing areas and sealing areas made from different materials. Hence such types of intermediate layers may be made using a two-component injection molding system. Such integral types of intermediate layers may help to facilitate the assembly of a wheel. Alternatively a sealing area may be vulcanized onto a bearing area, or vice versa.

Connection elements, respectively e.g. screws, may be arranged in different ways, including those shown in EP1858715 B1. For some special types of wheels, such as wheels used for motorcycles, a connection element may protrude the rim at the rim well. For some other applications a connection element may protrude the rim in a region between the rim well and the outer hump. For other applications, a connection element may protrude the rim in a region between the outer hump and the outer rim edge. However, the present invention is not limited to such arrangements of connection elements.

Good results may be achieved if connection elements, such as e.g. screws or bolts, are aligned essentially perpendicular to the intermediate layer. Hence static friction between the at least one first and the at least one second contact area can be increased which allows improving torque transmission between a wheel center and a rim.

Alternatively or in addition, an adhesive may be inserted in the junction region between the wheel center and the rim in order to at least improve sealing of this region. Thus, intrusion of moisture into the space between connection element, rim and bushing (of present) and/or leakage of pressurized gas from the tire/rim volume can be decreased. The connection element may be at least partially embedded in such an adhesive. Good results may be obtained if the wheel comprises a bushing and the adhesive is inserted in said junction region before the bushing and the connection element are mounted. Good results can be obtained if polyurethane adhesives are used.

At least a part of the rim's surface which is directed to the wheel and during operation exposed to the pressurized gas in the tire may be coated with a barrier layer that is impermeable to the gas to be filled in the tire/rim-volume, in particular with a layer made from a polymeric substance. Thus, stress corrosion cracking and leakage of pressurized gas through micro-cracks may be reduced. Good results may be obtained if the barrier layer comprises a material that has a higher elasticity (elastic modulus) than the matrix of the fiber reinforced plastic, e.g. a silicone material, in particular a silicone varnish. Using a material with a relatively high elasticity allows reliable sealing of micro-cracks (or even larger cracks) that open due to cyclic loading or changes in wheel temperature. For some applications, the barrier layer may comprise multiple layers made from the same and/or from different materials. In one embodiment, the barrier layer comprises a layer that increases friction of the tire mounted on the rim. Hence relative movements between the tire and the rim can be prevented.

BRIEF DESCRIPTION OF SEVERAL VIEWS OF THE DRAWINGS

The herein described invention will be more fully understood from the detailed description of the given herein below and the accompanying drawings, which should not be considered as limiting the invention described in the appended claims.

DETAILED DESCRIPTION OF THE INVENTION

Figure 1:
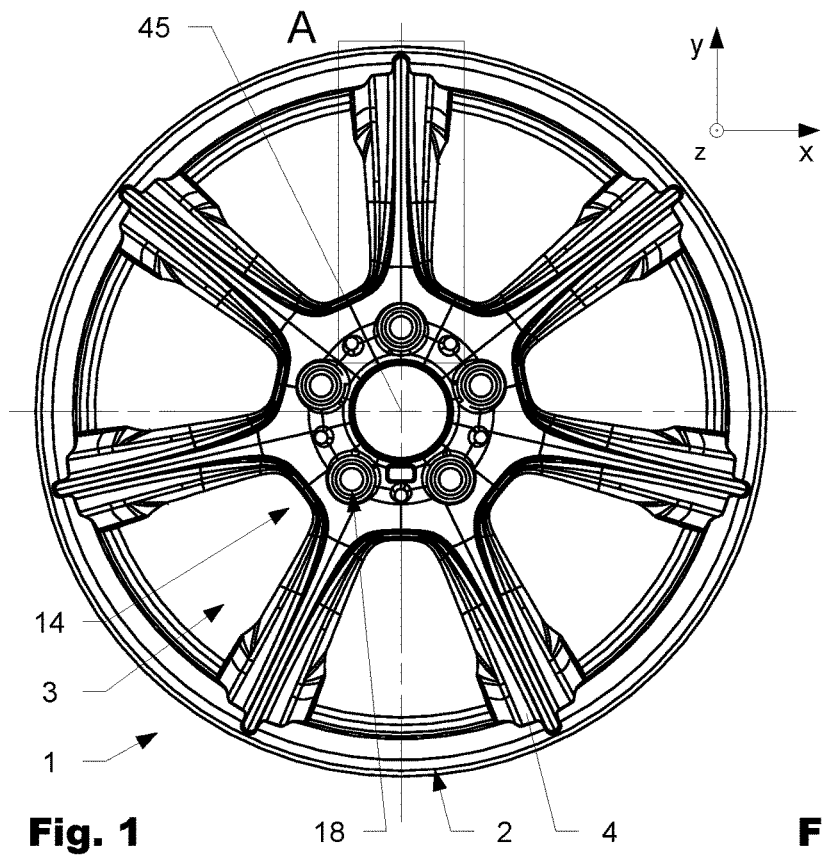
FIG. 1 schematically shows an embodiment of a wheel in a front view.
Figure 2:
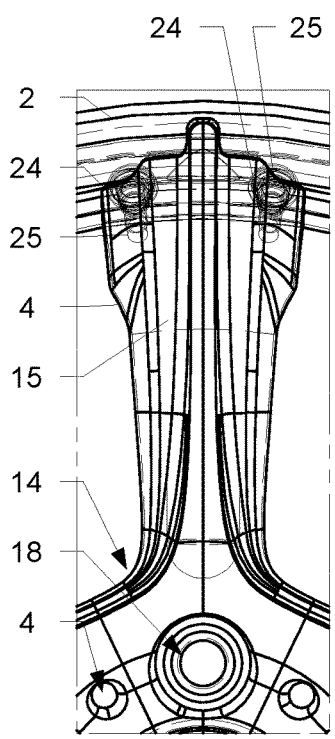
FIG. 2 shows detail A of FIG. 1.

The foregoing summary, as well as the following detailed description of the preferred embodiments, is better understood when read in conjunction with the appended drawings. For the purpose of illustrating the invention, an embodiment that is presently preferred, in which like numerals represent similar parts throughout the several views of the drawings, it being understood, however, that the invention is not limited to the specific methods and instrumentalities disclosed.

FIGS. 1-9 show several variations of a wheel 1 according to the invention. The wheel 1 comprises a rim 2 made from a fiber reinforced plastic, such as a carbon fiber reinforced plastic. In addition, the rim 2 comprises a rim well 7 which is arranged between an inner rim edge 5 and an outer rim edge 6, suited to receive a tire (not shown). The wheel 1 further comprises a wheel center 3 that comprises a wheel hub 14 which can be connected to a vehicle's wheel suspension (not shown) and a serves as a support for the rim 2. The wheel center 3 in the shown variation comprises seven spokes 4 (other numbers are possible). The wheel center 3 and the rim are connected by means of bolts 24, as will be described in further detail below.

Figure 3:
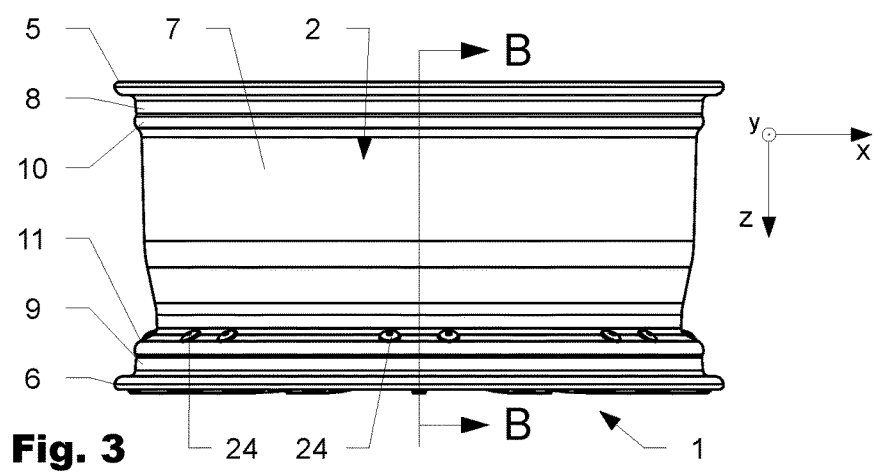
FIG. 3 shows the wheel according to FIG. 1 in a top view.
Figure 4:
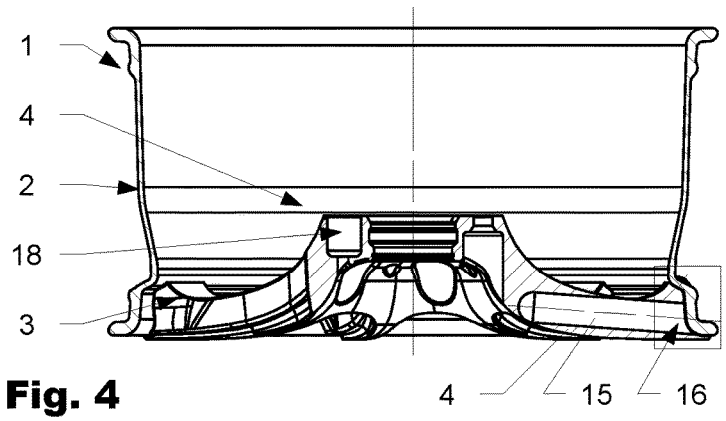
FIG. 4 shows a section view along section line BB of FIG. 3.

As visible in FIG. 3, the rim 2 comprises an inner and an outer rim shoulder 8, 9, an inner and an outer hump 10, 11. The wheel center 3 is interconnected to the rim 2 by bolts 24 which in the shown variation are located between the outer hump 11 and the rim well 7 extending in an inclined manner into bores 25 arranged in the spokes 4, as e.g. visible in FIG. 5. The wheel center 3 is fastened to the rim 2 in the region of the outer shoulder 9, respectively the outer rim edge 6 and the outer hump 11.

The wheel 1 comprises a rim 2 and a wheel center 3 which is interconnected to the rim 2. The wheel center 3 comprises at least one spoke 4 extending from a wheel hub 14 to the rim 2 in a radial direction. The rim 2 comprises per the at least one spoke 4 a first contact area 12 and the at least one spoke 4 comprises at its outer end a second contact area 13 which is aligned to the first contact area 12 in a mounted position. The at least one spoke comprises a hollow space 15 extending in the radial direction of the spoke 4. The cross-section 34 of the spoke 4 (FIG. 7) thereby becomes a cellular design comprising at least one cell which is encompassed by the material of the spoke 4. If appropriate, the cross-section of the spoke may comprise more than one cell arranged adjacent to each other. Depending on the field of application such a single and/or multi-cellular design results in a very good distribution and transfer of the occurring forces between the rim 2 and the wheel hub 14.

Figure 5:
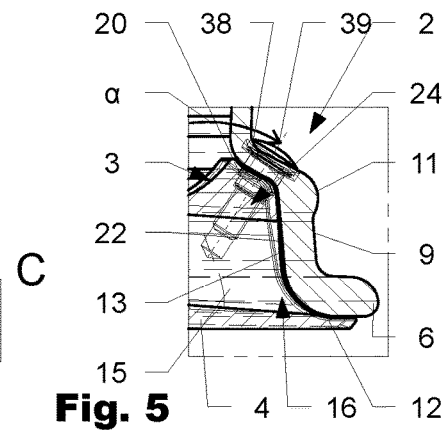
FIG. 5 shows detail C according to FIG. 4.
Figure 6:
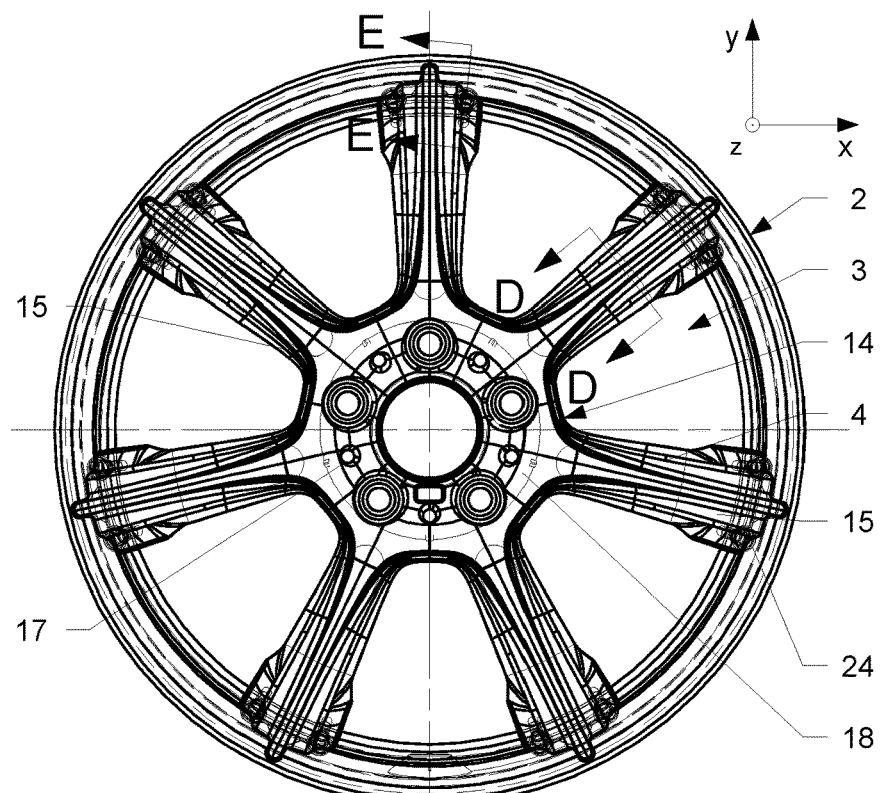
FIG. 6 shows the wheel according to FIG. 1 in a front view including hidden lines.
Figure 9:
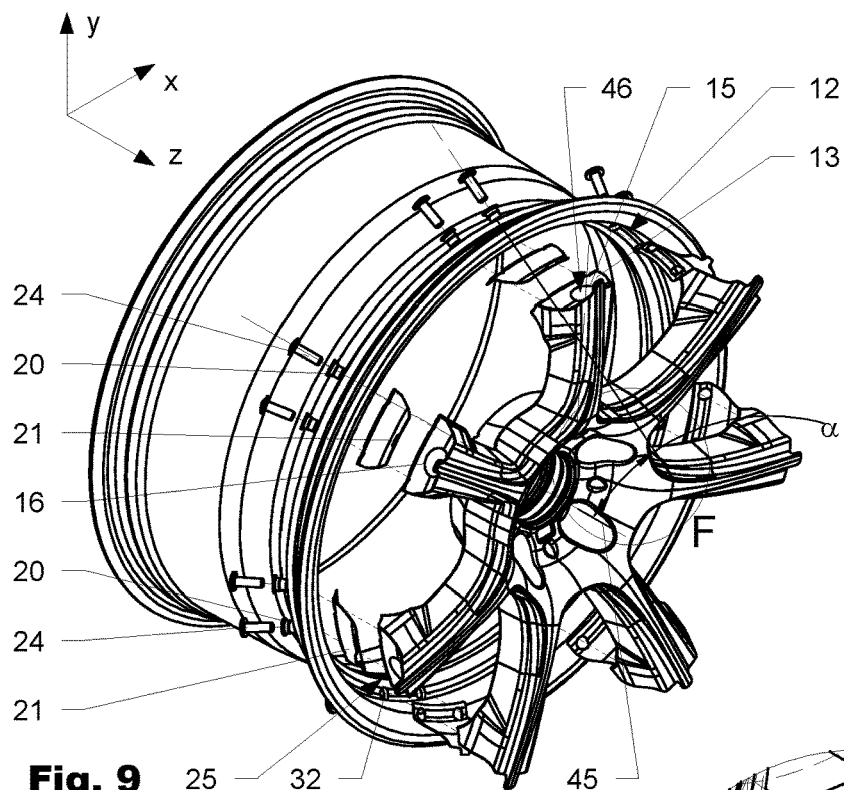
FIG. 9 shows a variation of the wheel in an exploded view.

As e.g. visible in FIG. 5 and FIG. 9, the rim 2 comprises on its centripetal side (radially inwards) a first contact face 12 which is spaced apart but still relatively close to a second contact face 13, located on the centrifugal side (radially outwards) of the spokes 4. The second contact face at least partially aligns to the first contact face 12. Between the rim 2 and the spokes 4 (respectively the first and the second contact face 12, 13) an intermediate element 21 is arranged. Said intermediate element 21 is on a first (centrifugal) side contacted by the first contact face 12 of the rim 2 and on the second (centripetal) side contacted by the second contact face 13 of the spoke 4. Thus the intermediate element 21 prevents a direct physical contact between the first and the second contact face 12, 13.

In the shown variation, the intermediate element 21 comprises an intermediate layer 22 which is encompassed along an outer edge by a seal 23 (sealing area) integrally connected to the intermediate layer. The seal 23 prevents moisture, dust and air from entering the region between rim 2 and spokes 4 (respectively wheel center). The seal 23 may also be referred to as a sealing bead. In a mounted state, the seal 23 is clamped between the first and second contact face 12, 13 providing a sufficient sealing effect. In the embodiment shown, the seal 23 is made from an elastic material, such as vulcanized rubber. Due to the elastic material properties, a reliable sealing can be provided, even if cyclic deformations of the junction—e.g. due to rotations of the wheel when driving—are present. The seal 23 may be arranged at a location where the gap (interstitial space) between rim 2 and wheel center 3 starts to widen. Such a widening gap allows better drying and cleaning—respectively an increased removal of moisture and dust—of the boundary region between rim 2 and wheel center 3 that is neither separated by the intermediate layer 22 nor the seal 23.

Figure 8:
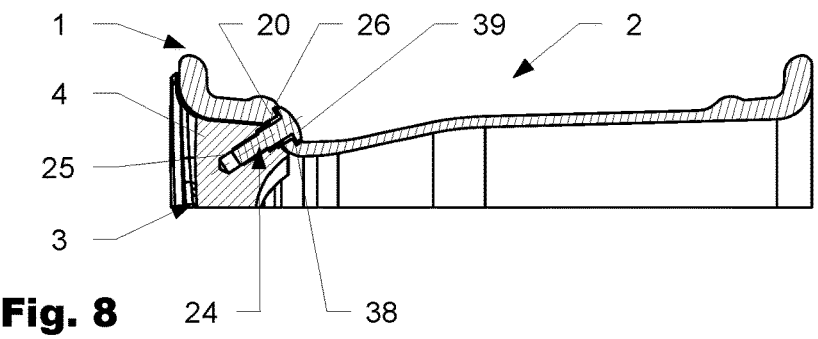
FIG. 8 shows the wheel according to FIG. 6 along section line EE.

The mechanical connection between rim 2 and wheel center 3 is at least partially established by bolts 24 that are inserted into a stepped bore 25 in the spokes 4 of the wheel center 3, as e.g. shown in FIG. 5 and FIG. 8. In the shown variation each spoke 4 is attached with two bolts 24 that are in circumferential direction arranged in two bores 25 on both sides of the hollow space 15 of the spoke 4 and protrude the rim 2 in a region between the rim well 7 and the outer hump 11. The bores 25 are orientated at an angle α with respect to a central axis (axis of rotation) 45 of the wheel. Locally they are arranged essentially perpendicular to at least part of the intermediate layer 22. Good results can be obtained if the α is in the range of 30°+/−10°. An alternative number or local arrangement of bolts 24 and bores 25 are possible. A bushing 20 is arranged on the bolt 24, extending from the stepped bore 25 to the port 32 of the rim 2. The bushing 20 comprises a flange 38 which supports a head 39 of the bolt 24 with respect to the shoulder 26 of the bore 25. The bushing 20 extends across the rim 2 and reaches into the spoke 4. It helps transferring drive and/or brake torque from the wheel center 3 to the rim 2. The bushing 20 may also serve as an electrical insulator preventing contact corrosion between the bolt (respectively the electrode potential of the wheel center 3 and the bolt 24) and the rim 2. Between the rim 2 and the bolt's 24 head an additional seal, e.g. in the form of an o-ring (not shown in detail) may be arranged which prevents moisture from entering in the space between bolt 24, rim 2 and spoke 4. In addition the o-ring can also serve as an electrically insulating element, preventing contact corrosion between the bolt's 24 head and the rim 2.

Figure 10:
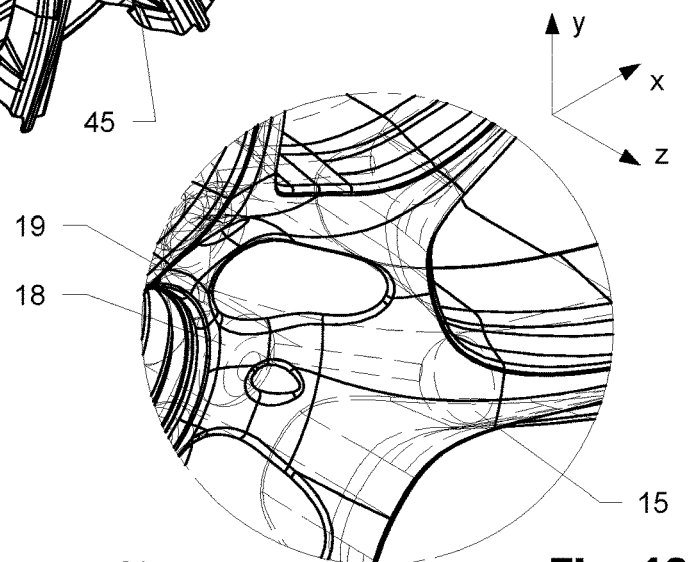
FIG. 10 shows detail F according to FIG. 9.

The wheel hub 14 may comprise one or several recesses 18, as e.g. visible in FIG. 10. The at least one recess 18 can e.g. serve as weight reducing means and/or for venting purposes. In the shown variation the recesses 18 are arranged on the inside of the wheel 1 which is in a mounted position not visible from the outside.

The at least one hollow space 15 can be interconnected to the outside by a channel 19 extending from an inner end with respect to the radial direction of the spoke 4 to the outside. The channel 19 can be interconnected to at least one recess 18. In the shown variation the channel 19 interconnects to the hollow space 15 and the recess 18. The channel 19 can be at least partially sealed by a sealing element (not shown in detail).

Figure 7:
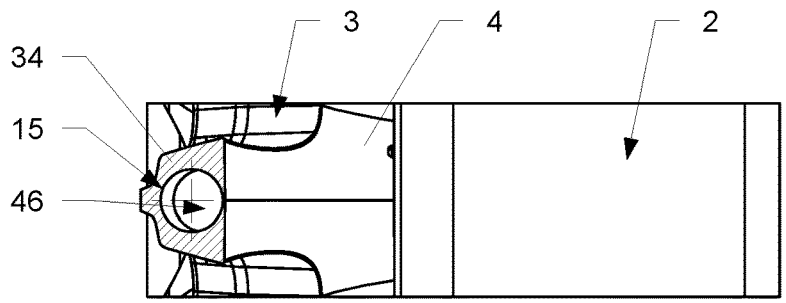
FIG. 7 shows the wheel according to FIG. 6 along section line DD.

As schematically visible in the section view according to FIG. 7 (along section line DD of FIG. 6), the hollow space 15 of the shown embodiments has an in principle cylindrical shape (other shapes can be adopted) extending in the longitudinal direction of the spoke 4. A cross-section 34 of the spoke 4 thereby becomes annular over a significant portion of its radial length. The load carrying material is thereby moved to the outside resulting in an overall better performance. The design and shape of the cross-section can vary depending on the wheel's design and purpose.

Depending on the field of application and the production process, the hollow space can have different design. The shape of the cross-section of the hollow space can vary along the radial extension of the hollow space. The hollow space 15 can be made by removing material from the outside e.g. by a drilling and/or a milling and/or a grinding and/or a forging process. Alternatively or in addition the hollow space 15 can be incorporated at least partially during the making of the wheel center 3, e.g. by a casting and/or a forging and/or an injection molding and/or a compression molding and/or a laminating process.

Figure 11:
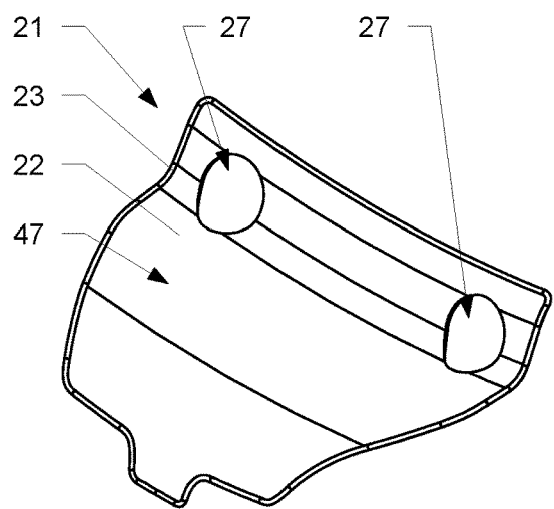
FIG. 11 shows a first variation of an intermediate element.
Figure 12:
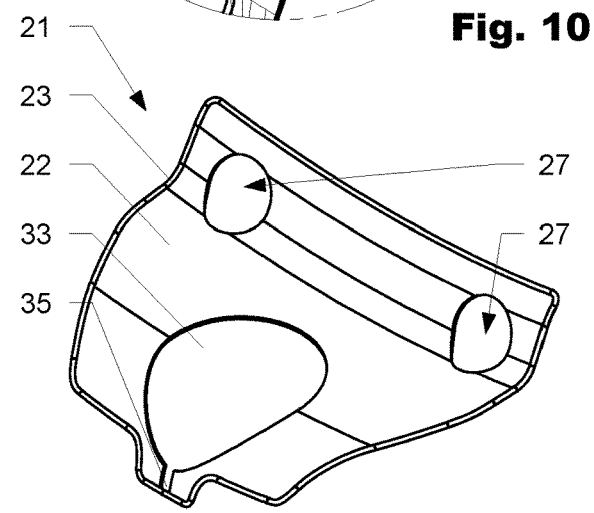
FIG. 12 shows a second variation of an intermediate element.

FIG. 11 and FIG. 12 show two variations of an intermediate element 21 as describe above. Both comprise an intermediate layer 22 which during operation transfers load between the rim 2 and the wheel center 3. The intermediate layer 22 is foreseen to compensate for disadvantages connected to the usage of different material properties and behaviors namely for the case that the rim 2 and the wheel center 3 are made from different materials. The intermediate element 21 may comprise at least one seal 23. The seal can be arranged along an outer edge as shown. Alternatively or in addition the seal 23 can be arranged at least partially on a surface of the intermediate layer. If appropriate, the intermediate element 21 can have a continuous design which in a mounted position seals the mouth 16 of the hollow space 15. Alternatively it can comprise at least one opening 33, as schematically shown in FIG. 12. The opening 33 is shaped in a way that drainage slot 35 is formed pointing radially outwards. The drainage slot 35 interconnects the outside with the hollow space 15, so that contaminating particles collected in the hollow space 15 are dislodged through the drainage slot 35 by centrifugal forces while driving. The intermediate element 21 can comprise at least one port 27 for at least one connection element 24 and/or an insert 20, as e.g. shown in FIG. 9.

The wheel 1 preferably comprises a rim 2 and a wheel center 3 interconnected to the rim 2. The wheel center 3 comprises at least one spoke 4 extending from a wheel hub 14 to the rim 2 in a radial direction. The rim 2 comprises per the at least one spoke 4 a first contact area 12 and the at least one spoke 4 comprises at its outer end a second contact area 13 which is aligned to the first contact area 12 in a mounted position. The at least one spoke 4 comprises at least one hollow space 15 extending in the radial direction of the spoke 4. The at least one hollow space 15 may penetrate the second contact area 12 forming a mouth 16. The second contact area 12 may encompasses the mouth 16 of the at least one hollow space. In at least one cross-section 34 of the spoke 4 at least two hollow spaces 15 may be arranged next to each other. A wall 46 of the hollow space 15 may be coated by a protective material. If appropriate, an intermediate element 21 is arranged between the at least one first and the at least one second contact area 12, 13 preventing at least partially direct contact between the at least one first and the at least one second contact area 12, 13. The intermediate layer 22 can seal the mouth 16 of the hollow space 15. The intermediate layer 22 may comprise at least one load bearing area/section. Alternatively or in addition, the intermediate layer 22 may comprise at least one sealing area 23. The at least one sealing area 23 may be arranged circumferentially of the intermediate layer 22. Good results can be achieved if the at least one sealing area 23 is made from an elastic material. The intermediate layer 22 may comprise a metal layer 47. The metal layer 47 can be coated by a polymeric material and/or a ceramic and/or a glass. At least one connection element 24 can be present which interconnects the rim 2 and the wheel center 3 via the at least one first and the at least one second contact area 12, 13. For good load distribution, the connection element 24 preferably protrudes the at least one intermediate layer 22 if present. The connection element 24 can be at least one element out of the group of a screw or a bolt or a rivet. In a preferred variation, the connection element 24 protrudes the rim 2 at the rim well 7 or in a region between the rim well 7 and the outer hump 11 or in a region between the outer hump 11 and the outer rim edge 6. The connection element 24 is preferably arranged essentially perpendicular to at least part of the intermediate layer 22. The connection element 24 can be embedded at least partially in an adhesive and/or covered from the outside by a protective layer of material, e.g. a layer of composite material. The intermediate layer 22 may comprise an adhesive that mechanically interconnects the at least one first and the at least one second contact area 12, 13. The rim 2 and/or the wheel center 3 are made from a material chosen from the group consisting of steel, aluminum, magnesium, titanium, fiber reinforced plastic with a fiber material made from carbon, aramide, glass, basalt, steel. As described above, the rim 2 and the wheel center 3 can be made from different or the same materials. The intermediate layer 22 may comprise one or several electrically insulating materials, such as rubber and/or a silicone and/or glass fibers and/or a ceramic.

Figure 13:
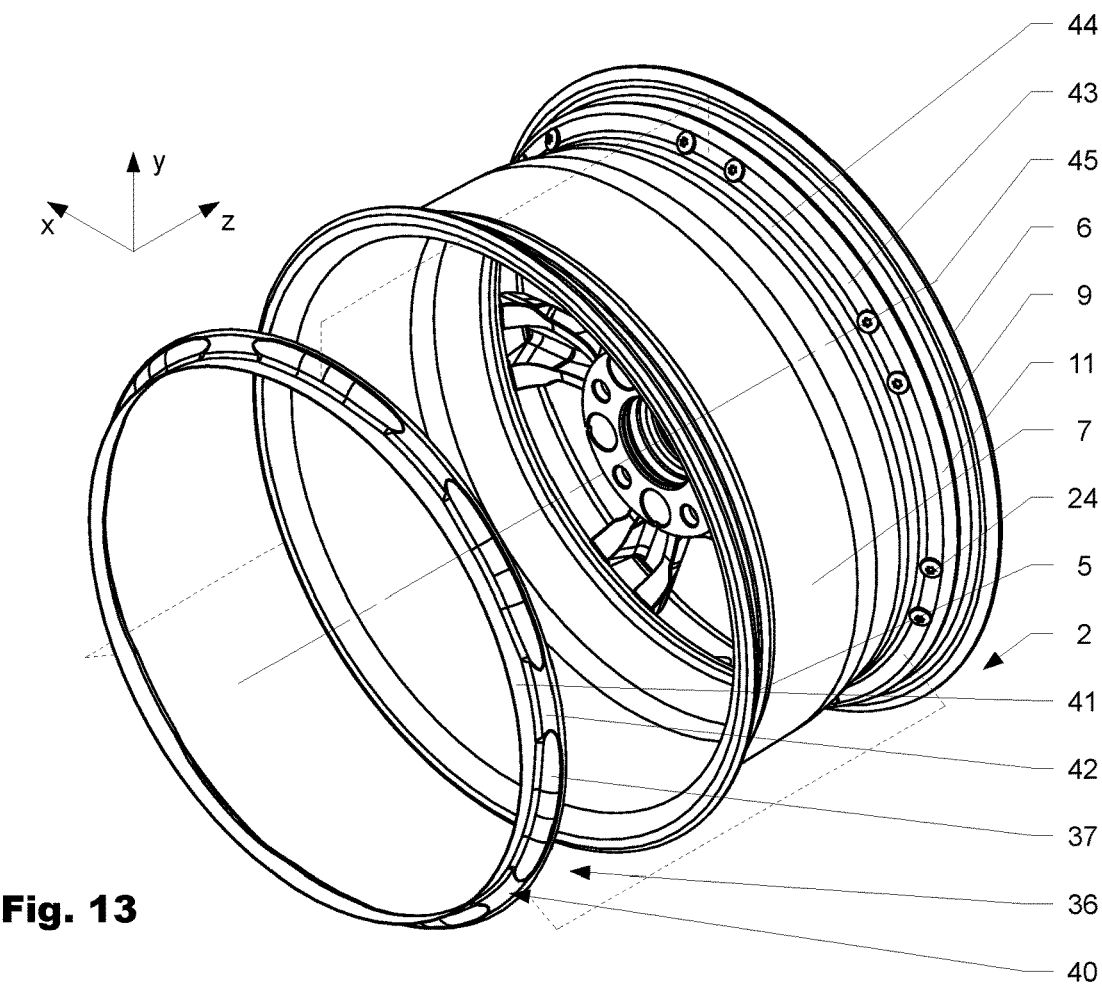
FIG. 13 shows a variation of the wheel with an annular cover in an exploded view.
Figure 14:
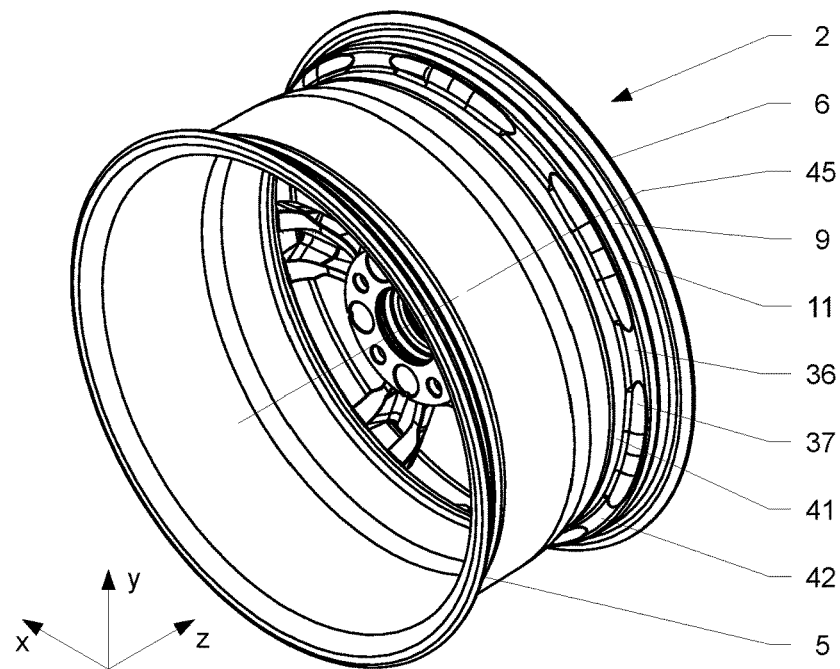
FIG. 14 shows the wheel and the annular cover in an assembled view.

FIG. 13 and FIG. 14 show an annular cover 36 for the bolts 24 of a wheel as described herein above. The annular cover 36 can be used for other hybrid wheels and should therefore be considered as an individual concept. FIG. 13 depicts the exploded view with dotted lines schematically indicating the composition of the assembly. FIG. 14 shows the fully assembled wheel. In the shown variation the annular cover 36 comprises a ring 40 with a first cylindrical section 41 and a second conical section 42 arranged to fit optimally to the shape of the wheel's rim 2 while covering the bores 25 of the connecting elements 24 over the whole circumference of the rim 2. This enhances the sealing and can prevent gas leakage of the tire volume. The shape of the second conical section 42 of the annular cover 36 corresponds to a conical rim section 43 adjacent to the outer hump 11 of the rim where the connecting elements 24 are arranged. The contact between the wheel and the annular cover 36 is further maximized by the first cylindrical section 41 of the annular cover 36 which is formed to at least partially fit to the substantially cylindrical rim section 44 adjacent of the rim's surface where the bolts 24 are placed. However, other shapes of the two sections 41, 42 are possible depending on the placement of the connecting elements 24 on the rim 2 and the individual shape of the latter. Furthermore, different numbers of ring sections are possible. Generally, adding a second adjacent section 41 to the section covering the bores 42 has the purpose to provide a larger overall surface of the annular cover 36 to glue and seal it to the rim 2.

If appropriate, the annular cover 36 can further exhibit recess cavities 37 to accumulate e.g. bolt heads 39 of the connecting elements 24. The use of recess cavities 37 prevent uneven contact between the rim and the annular cover 36 caused by the protruding parts of the connecting elements 24 and therefore enhance the sealing quality further. In this embodiment the recess cavities 37 are formed as individual lenticular pockets covering the two bolt heads 39 of each spoke. Alternatively, the pockets can accommodate a different number of bolt heads 39 and/or incorporate more than the bolt heads 39 from one spoke 4. Consequently, other shapes of the recess cavities are possible. In addition, the recess cavities can further be filled with sealing material.

The annular cover 36 is preferably made from composite material and/or injection molded material. It can further be slitted in one or multiple places between the recess cavities 37 in order to be fitted over the rim 2 and reconnected at the slitted ends. Alternatively, other solutions are possible, comprising shrinking material that can be put over the rim surface and shrinked through heat supply to seal the bore 25 and the bolt heads 39.

The invention claimed is:

1. A wheel (1) comprising:
   a. a rim (2) and a wheel center (3) interconnected to the rim (2);
   b. wherein the wheel center (3) comprises at least one spoke (4) extending from a wheel hub (14) to the rim (2) in a radial direction,
   c. wherein the rim (2) comprises per the at least one spoke (4) a first contact area (12), and
   d. the at least one spoke (4) comprises at an outer end a second contact area (13) which in a mounted position is aligned to the first contact area (12),
   e. an intermediate layer (22) arranged between the at least one first and the at least one second contact area (12, 13) preventing at least partially direct contact between the at least one first and the at least one second contact area (12, 13);
   f. wherein the at least one spoke (4) comprises at least one hollow space (15) extending in the radial direction of the spoke (4); and
   g. wherein the at least one hollow space (15) penetrates the second contact area forming a mouth (16), wherein at least one connection element (24) interconnects the at least one first and the at least one second contact area (12, 13) wherein the connection element (24) protrudes from the at least one intermediate layer (22).

2. The wheel (1) according to claim 1, wherein the second contact area (13) encompasses the mouth (16) of the at least one hollow space (15).

3. The wheel (1) according to claim 1, wherein in at least one cross-section (34) of the spoke (4) at least two hollow spaces (15) are arranged next to each other.

4. The wheel (1) according to claim 1, wherein a wall of the hollow space (15) is coated by a protective material.

5. The wheel (1) according to claim 1, wherein the intermediate layer (22) seals the mouth (16) of the hollow space (15).

6. The wheel (1) according to claim 5, wherein the intermediate layer (22) comprises at least one load bearing area and/or section.

7. The wheel (1) according to claim 1, wherein the intermediate layer (22) comprises at least one sealing area (23).

8. The wheel (1) according to claim 7, wherein the at least one sealing area (23) is arranged along an edge of the intermediate layer (22).

9. The wheel (1) according to claim 1, wherein the intermediate layer (22) comprises a metal layer.

10. A wheel (1) comprising:
    a. a rim (2) and a wheel center (3) interconnected to the rim (2);
    b. wherein the wheel center (3) comprises at least one spoke (4) extending from a wheel hub (14) to the rim (2) in a radial direction,
    c. wherein the rim (2) comprises per the at least one spoke (4) a first contact area (12), and
    d. the at least one spoke (4) comprises at an outer end a second contact area (13) which in a mounted position is aligned to the first contact area (12),
    e. an intermediate layer (22) arranged between the at least one first and the at least one second contact area (12, 13) preventing at least partially direct contact between the at least one first and the at least one second contact area (12, 13);
    f. wherein the at least one spoke (4) comprises at least one hollow space (15) extending in the radial direction of the spoke (4); and
    g. wherein the at least one hollow space (15) penetrates the second contact area (12) forming a mouth (16), wherein the intermediate layer (22) comprises an adhesive that mechanically interconnects the at least one first and the at least one second contact area (12, 13).

11. The wheel (1) according to claim 1, wherein the connection element (24) protrudes from the rim (2) at a rim well (7) or in a region between the rim well (7) and an outer hump (11) or in a region between the outer hump (11) and an outer rim edge (6).

12. The wheel (1) according to claim 1, wherein the intermediate layer (22) comprises an adhesive that mechanically interconnects the at least one first and the at least one second contact area (12, 13).

13. The wheel (1) according to claim 1, wherein the intermediate layer (22) comprises an electrically insulating material.

14. The wheel (1) according to claim 10, wherein at least one connection element (24) interconnects the at least one first and the at least one second contact area (12, 13) wherein the connection element (24) protrudes from the at least one intermediate layer (22).

* * * * *